U. REYNOLDS.
Fifth Wheel.
No. 54,958.                      Patented May 22, 1866.
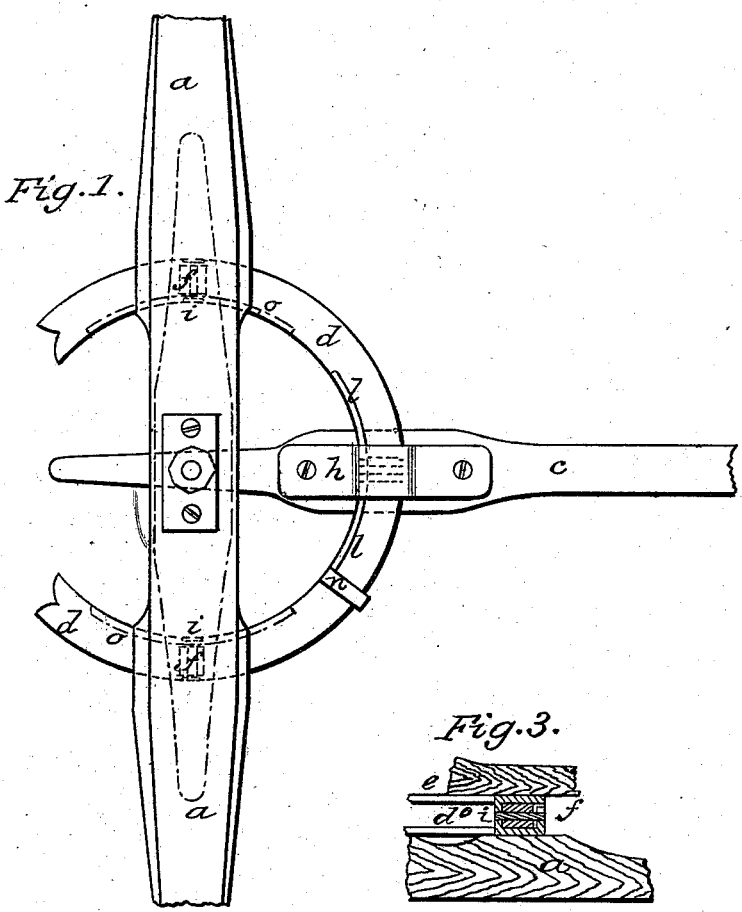
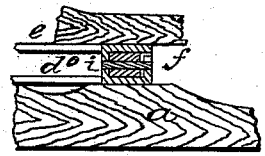
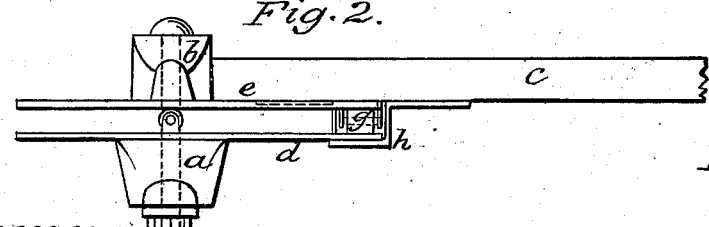

UNITED STATES PATENT OFFICE.

UEL REYNOLDS, OF NEW YORK, N. Y.

IMPROVEMENT IN FIFTH-WHEELS FOR VEHICLES.

Specification forming part of Letters Patent No. 54,958, dated May 22, 1866.

*To all whom it may concern:*

Be it known that I, UEL REYNOLDS, of the city and State of New York, have invented, made, and applied to use a certain new and useful Improvement in Fifth-Wheels for Vehicles; and I do hereby declare the following to be a full, clear, and exact description of the said invention, reference being had to the annexed drawings, making part of this specification, wherein—

Figure 1 is an inverted plan of the axle, perch, and fifth-wheel. Fig. 2 is an end view of said axle and fifth-wheel. Fig. 3 is a section through one side of the fifth-wheel.

Similar marks of reference denote the same parts.

The fifth-wheels heretofore constructed produce considerable friction in turning and require grease upon the surfaces in contact, which generally mars the appearance of the vehicle. It is usual with carriages and wagons to put a guard upon the side of the body to prevent injury from the wheel when it comes in contact in turning; but this does not prevent the wheel sometimes running under the body of the wagon, or partially so.

The nature of my said invention consists in an anti-friction fifth-wheel and stop-guard, by which the wheels are prevented from coming into contact with the body of the carriage, and the friction of said fifth-wheel is lessened and the usual greasing can be dispensed with.

In the drawings, $a$ is a portion of the axle, $b$ is the head-block, and $c$ the perch, of any usual or desired character.

$d$ is the lower and $e$ the upper arcs or circles forming the fifth-wheel. These are to be bolted to the respective parts.

$ff$ are rollers set upon jaws extending above the arc $d$ over the axle $a$, and $g$ is a roller within a jaw below the arc $e$ and beneath the perch $c$.

It will now be evident that the rollers $f$ and $g$ sustain the weight of the vehicle, and roll with but little friction when the axle is turned upon the king-bolt. For heavy vehicles the number of rollers might be increased.

In order to guide the circles or arcs and keep them properly in place over each other, I extend up the jaws carrying the rollers, as seen at $i$, so that the same comes upon one side of the adjacent circle or arc, and I notch said circle or arc for the reception of said projection $i$, said notch being of the required length, so that in turning the axle upon its king-bolt the projection $i$ will take against the end of its notch in either direction before the wheel comes in contact with the body of the vehicle, thus forming a stop-guard. The notches for the projections $i$ $i$ are shown by dotted lines in Fig. 1 at $o$ $o$.

The strap or loop $h$ upon the under side of the perch $c$ incloses the fifth-wheel circles $d$ $e$, and also acts as a stop-guard as the axle swivels or turns, the ends of the notch $l$ taking against the edges of this loop $h$, and, if desired, a block or blocks, $n$, may be formed upon the circle $d$, taking against the edge of said loop $h$, to form the stop to the further movement of the fifth-wheel.

It will be evident that in some characters of vehicles the rollers $ff$ may be used and the arc $d$ be dispensed with, said rollers $ff$ taking the under side of the arc $e$.

What I claim, and desire to secure by Letters Patent, is—

1. A stop-guard for preventing the wheels coming in contact with the body, formed by projections or stops upon the fifth-wheel, substantially as set forth.

2. The anti-friction rollers and jaws, in combination with the fifth-wheel circles or arcs, as set forth.

In witness whereof I have hereunto set my signature this 13th day of March, A. D. 1866.

UEL REYNOLDS.

Witnesses:
CHAS. H. SMITH,
THOS. G. C. MOUNTAIN.